United States Patent [19]

Yamauchi

[15] 3,704,509
[45] Dec. 5, 1972

[54] ANNEALING FOR STRESS RELIEVING OF MULTILAYER PRESSURE VESSELS
[72] Inventor: Takeshi Yamauchi, Kobe, Japan
[73] Assignee: Kobe Steel, Ltd., Fukiai-ku, Kobe-shi, Japan
[22] Filed: July 6, 1970
[21] Appl. No.: 52,410

[30] Foreign Application Priority Data

July 5, 1969 Japan.....................44/53385

[52] U.S. Cl. ................29/471.1, 29/487, 113/120 S, 148/127
[51] Int. Cl. ............................................B23k 31/02
[58] Field of Search..113/120 S; 29/471.1, 487, 473.3 148/127

[56] References Cited

UNITED STATES PATENTS

| | | | |
|---|---|---|---|
| 2,111,791 | 3/1938 | Larson | 113/120 S |
| 2,308,307 | 1/1943 | Robinson | 29/487 X |
| 2,365,696 | 12/1944 | Grubb | 29/471.1 |
| 2,489,802 | 11/1949 | Needham | 29/471.1 |
| 2,763,923 | 9/1956 | Weff | 29/487 X |
| 3,024,938 | 3/1962 | Watter | 29/471.1 X |
| 3,091,848 | 6/1963 | Frank | 29/487 X |
| 3,264,732 | 8/1966 | Fannon, Jr. | 29/487 |
| 3,386,162 | 6/1968 | Woelfer | 29/471.1 |

OTHER PUBLICATIONS

" The Welding Encyclopedia" pp. 61– 65, published 1947.

Primary Examiner—John F. Campbell
Assistant Examiner—Richard Bernard Lazarus
Attorney—Oblon, Fisher & Spivak

[57] ABSTRACT

A process of annealing for stress relieving of multilayer pressure vessels having a multilayer wall of a material capable of being appreciably hardened upon subjection to the welding heat or of relatively thick plates, which comprises individually annealing for stress relieving a unitary multilayer cylinder with or without prior annealing of the innermost layer alone, and then locally annealing the vessel fabricated of the cylinder and end plates along the circumferential welds thereof.

6 Claims, 5 Drawing Figures

ANNEALING FOR STRESS RELIEVING OF MULTILAYER PRESSURE VESSELS

This invention relates to annealing for stress relieving of multilayer pressure vessels, of which the multilayer wall is formed of a material that is highly thermohardening when heated for welding or is made of relatively thick plates.

Ordinary multilayer pressure vessels are, for the most part, not annealed although they are sometimes partly annealed for stress relieving during the course of fabrication. Since their individual plates constituting the multilayer wall are thin and the plate material will not be hardened remarkably by the heat of welding, the conventional pressure vessels have such low rigidity of welds on the multilayer wall and such little residual stress that they need no annealing for stress relieving. In some cases when a welding-heat-hardenable material is used to form the end plates or the innermost layer, it has been in practice to fabricate a vessel from the multilayer cylinder units by circumferential welding and then place the vessel into a heating furnace for heating from the outside. An alternative practice has been to treat the vessel for the protection of the outermost layer against heat and then heat the vessel from the inside for stress relieving by suitable heating means such as hot gas or electric heat. A further alternative has been to pad the ends of the vessel by welding with a material which is not hardened by the heat of welding and thereafter locally anneal the padded portions only.

It is noted that, for the purpose of stress relieving, the work must be kept at a suitable annealing temperature for a predetermined period depending upon the kind of the material and the thickness of the plate used. However, the relationship between the temperature and time is actually very complicate; inadequate or excessive, either factor would seriously affect the strength of the material at normal and elevated temperatures, thus providing pressure vessels of poor quality.

In the known process of annealing, the multilayer section displays poor heat transmission through the cylindrical wall as compared with the section of a single-layer structure. The periods of time required for the temperature rise and drop of the steel plates constituting the innermost and outermost layers are more widely diverse than those on the inner and outer surfaces of the single-layer cylinder, and it is difficult to anneal the different members of the inner and outer layers for accordingly varied lengths of time. When annealing is to be resorted to following the fabrication by welding, it is impossible simultaneously to use different annealing temperatures and durations best suited to the individual work members because, while the multilayer wall consists of relatively thin plates, the circumferential joints have a thickness continuous from the innermost to the outermost layers, or a thickness equivalent to the total thickness of the multiple layers, and the end plates also vary in thickness, thus differing widely from the thickness of the steel plates which form the multilayer wall. Further, the tensioning forces exerted inwardly by the wrapping of the individual steel plates compress the previous layers, and this compressive force may cause eventual collapse of the inner layers as the steel material softens upon annealing. In a pressure vessel cylinder whose multilayer wall is circumferentially welded, the residual stress in the weld makes the danger of collapse even greater to disadvantage.

For multilayer pressure vessels having multiple layers of a highly welding-heat-hardenable material such as Cr-Mo steel or of relatively thick plates of over 20 mm in thickness, to which the present invention is best applicable, the annealing of the multilayer wall which has practically been neglected thus far is now indispensable. Moreover, the quality of the product is largely dependent upon how the annealing is performed. For these reasons, the conventional technique of annealing which has the disadvantages above pointed out should never be employed for the manufacture of pressure vessels of this type.

The present invention, perfected with the foregoing in view, provides a new annealing process for multilayer pressure vessels which use multiple layers of an appreciably thermohardening material or plates of relatively great thickness. The process is characterized by stress relief annealing which is conducted in sequence throughout the course of fabrication of a multilayer pressure vessel. To be more exact, the multilayer cylinder units fabricated are individually annealed for stress relieving and, after joining of the multilayer cylinder units together or with end plates by circumferential welding, the circumferential welds alone are locally annealed for stress relieving.

The present invention will be more fully described hereunder in connection with a process for fabricating a multilayer pressure vessel as illustrated in the accompanying drawings, in which.

Figure 1:
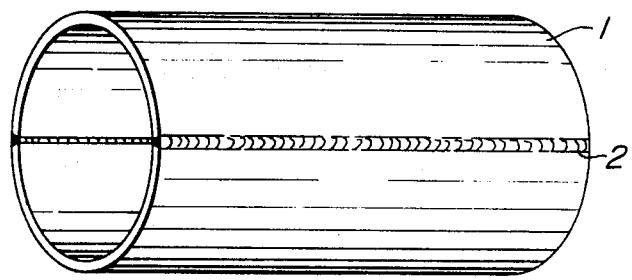
FIG. 1 is a perspective view of an innermost cylinder for a multilayer pressure vessel.

As shown specifically in FIG. 1, a highly welding-heat-hardenable material 1, e.g., a 12 mm-thick steel plate for an innermost layer or cylinder that conforms to ASTM A387GrD (2.25% Cr-1% Mo steel), is bent to a cylindrical shape and welded along the longitudinal seam as at 2 with a welding rod conforming to JIS DT2416 (2.25% Cr-1% Mo steel) to the form of a perfect cylinder. If necessary, the inner surface of the cylinder may be padded with a corrosion-resistant material, such as TYPE 347 (not shown). As exemplified by this embodiment, the innermost cylinder is formed of a material having a particularly great thermohardening property and is padded on the inner surface with a corrosion-resistant material. In such a case, merely the annealing of the innermost cylinder as one step of stress relieving of the invention is conducted following the fabrication of the innermost cylinder. When the innermost cylinder is merely welded longitudinally along the line 2, local annealing for stress relieving of the longitudinal weld is the only requirement. However, when the inner surface of the cylinder is padded with a noncorrosive material, the cylinder must be annealed throughout in a heating furnace or the like. In this example the annealing was carried out at 720° C. for 2 hours. Depending upon the kind of material used, the annealing of the inner cylinder may be omitted and, instead, the cylinder may be subsequently annealed together with multilayer cylinder units.

Figure 2:
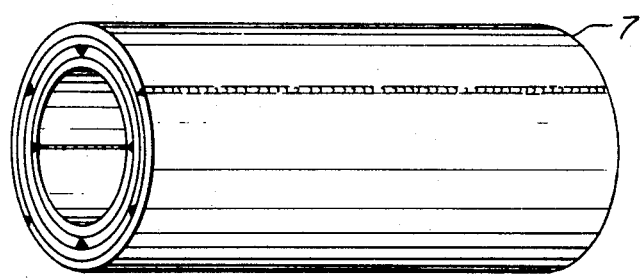
FIG. 2 is a perspective view of a multilayer cylinder consisting of multiple layer units.
Figure 3:
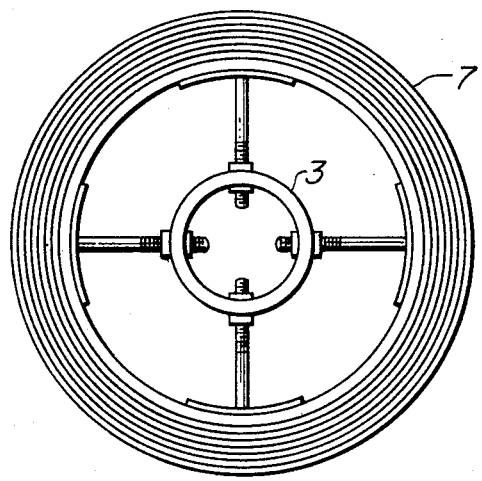
FIG. 3 is a side elevational view of a multilayer cylinder units as supported for annealing by an inside supporting means.
Figure 4:
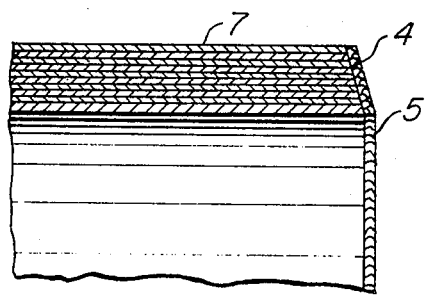
FIG. 4 is a longitudinal sectional view of the multilayer cylinder units as prepared and padded at edges.

Next, a multilayer section is formed over the innermost cylinder in the usual manner. A material appreciably hardenable upon subjection to the heat of welding, e.g., a layer-forming plate 6 mm in thickness of the same material as the innermost cylinder which conforms to ASTM A387GrD, is concentrically applied over the innermost cylinder in 10 layers or 10 wraps around the cylinder to form multilayer cylinder units 7 as shown in FIG. 2. Of course, a single plate may be coiled 10 times instead of the 10 wraps. Next, the annealing of the multilayer cylinder units 7 as a step of stress relieving of the invention is carried out. If the annealing of the innermost cylinder for stress relieving is preceded, it is not necessary to take the cylinder into consideration in choosing the temperature-time conditions for annealing, but care has only to be used not to give any adverse effect upon the cylinder. In this example, the annealing was conducted at 700° C. for 2 hours. When the innermost cylinder and the multilayer units are simulatenously annealed, substantially the same annealing conditions such as temperature and time may be employed to perform uniform annealing because the both components are formed of the same material with similar plate thickness. In carrying out this annealing, it is necessary, when the conditions such as the plate thickness of the innermost layer warrant, to fit strong supporter means 3 in the innermost cylinder in the manner as illustrated in FIG. 3, so as to keep the cylinder from collapsing due to the softening of the steel plate material. Desirably, prior to the annealing, the both ends of the multilayer cylinder units 7 are prepared at edges as at 4 in FIG. 4, and padded by welding at 5 with a rod material of JIS DT2416. This reduces the distortion and residual stress of the multilayer section which normally result from the circumferential welding of the multilayer cylinder units 7 in the ensuing stage of the process, and hence it facilitates the subsequent annealing after the fabrication.

Figure 5:
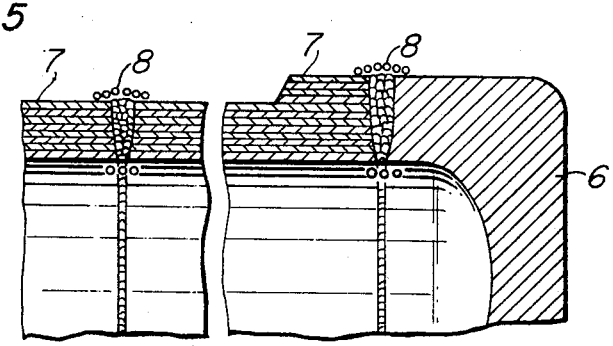
FIG. 5 is a longitudinal view, partly in section, of a multilayer pressure vessel fabricated by circumferential welding, showing the section of the circumferential welds and the annealed portion in particular.

Then, as better shown in FIG. 5, the individual multilayer cylinder units 7 are welded to one another or with end plates 6 of ASTM A182F22 (2.25% Cr–1% Mo steel) which have the plate end thickness of 110 mm and are fabricated altogether by circumferential welding as at 8 with a welding rod conforming to JIS DT2416. On completion of the fabrication, the circumferential welds 8 alone are heated on the inner or outer surface or both by electric or hot gas means or the like at a suitable temperature for an adequate length of time. In this way the local annealing of the circumferential welds 8 which represents the final step of the stress relief annealing of the invention is performed. In the example under review, the local annealing was carried out at 700° C. for 2 hours. Here again, for the same reason as above explained, the final annealing locally of the circumferential welds 8 is facilitated by padding the both ends of the multilayer cylindrical units and the end plates beforehand, because the padding reduces the thermal distortion or residual stress of the multilayer cylinder and the end plates caused by the circumferential welding.

If a multilayer pressure vessel of a highly thermohardening material as used in the example under consideration is to be annealed conventionally, the vessel fabricated by circumferential welding has to be annealed as a whole somehow or other since the annealing of the multilayer cylinder is an absolute necessity. Then the entire structure must be annealed at 720° C. for 10 to 14 hours. This means that, whereas the present invention involves a total annealing time of at most about 6 hours, the conventional process calls for much longer time, say 2 to 2.5 times greater than in this invention. Clearly, it is a serious disadvantage from the standpoint of thermal economy. It should also be noted that the innermost cylinder is annealed in accordance with this invention for a total period of 4 hours, that is, for 2 hours each at the time of annealing of the innermost cylinder itself and of the multilayer cylinder units, thus enabling the latter to be annealed for 2 hours only, while conventionally, both of the components must be annealed together for the same period of 10 to 14 hours. Inasmuch as the strength of material drops markedly with annealing time, the present invention which involves much shorter annealing time than in the conventional process minimizes the loss of material strength and, hence, the invention makes it possible to manufacture pressure vessels which can withstand by far the greater pressures than do ordinary vessels. Further, in the practice of the present invention, the innermost cylinder is annealed at 720° C. but the multilayer cylinder thereover may be annealed at a lower temperature of 700° C. Thus, in contrast to the usual practice whereby the vessel in its entirety has to be annealed at the same temperature of 720° C., thereby bringing a material reduction in strength of the multilayer section, this invention renders it possible to use optimum temperature-time conditions for the respective components of the vessel. Under the invention, therefore, the problem of weakening of the multilayer section due to annealing is completely settled, and high-grade products can be provided.

While an embodiment of the invention using a material of a high thermohardening property has so far been described, it should be obvious, of course, that the stress relief annealing of this invention is not limited thereto but is applicable as well to ordinary structural steels provided that the plates to constitute the multiple layers are thick enough to require annealing of the multilayer structure.

As described in detail hereinabove, the present invention is practiced by performing annealing in succession during the manufacture of a multilayer pressure vessel which is comprised of a multilayer cylinder structure of a highly thermohardening material or relatively thick plate material. Accordingly, it solves the problem of ununiformity in annealing which is otherwise caused by the difference in thickness and the type of material between the multilayer section consisting of laminated steel plates, single-layer end plates, and circumferential welds joining the multilayer cylinder units with one another or with the end plates. Since the components to be annealed are so treated uniformly at desirable temperatures for desirable periods of time, the multilayer pressure vessels produced in conformity with the present invention are improved in quality and safety over the conventional products.

What is claimed is:

1. A method of providing stress relief in preparing a multilayer pressure vessel, comprising the steps of:
   fabricating multilayer cylindrical units of relatively thick thermohardening material wherein each layer is at least 3.2 millimeters in thickness;
   annealing each of said cylindrical units for stress relieving the same;
   connecting said cylindrical units end-to-end by circumferential welding; and
   locally annealing said circumferential welding between said connected cylindrical units for stress relieving the same.

2. A method according to claim 1, wherein each of said multilayer cylindrical units are fabricated by welding the innermost layer thereof along a longitudinal seam to provide a perfect cylinder, and by annealing said innermost cylinder layer for stress relieving the same.

3. A method according to claim 1, further comprising:
   fabricating an end plate for closing an end of one of said cylindrical units;
   connecting said end plate to said end one of said cylindrical units by circumferential welding; and
   locally annealing said circumferential welding between said end plate and said end one of said cylindrical units.

4. A method according to claim 2, further comprising:
   fabricating an end plate for closing an end one of said cylindrical units;
   connecting said end plate to said end one of said cylindrical units by circumferential welding; and
   locally annealing said circumferential welding between said end plate and said end of one of said cylindrical units.

5. A method of providing stress relief in preparing a multilayer pressure vessel, comprising the steps of:
   fabricating at least one multilayer cylindrical unit;
   annealing said at least one cylindrical unit;
   connecting an end plate to one end of said at least one cylindrical unit by circumferential welding for closing the same; and
   locally annealing said circumferential welding between said end plate and said at least one cylindrical unit wherein each layer is at least 3.2 millimeters in thickness.

6. A method according to claim 5, wherein the innermost layer of said at least one multilayer cylindrical unit is welded along a longitudinal seam to provide a perfect cylinder, and annealing said innermost cylinder layer for stress relieving the same.

* * * * *